March 29, 1949. M. C. WHITE 2,465,775
ALTIMETER
Filed Aug. 10, 1945 2 Sheets-Sheet 1
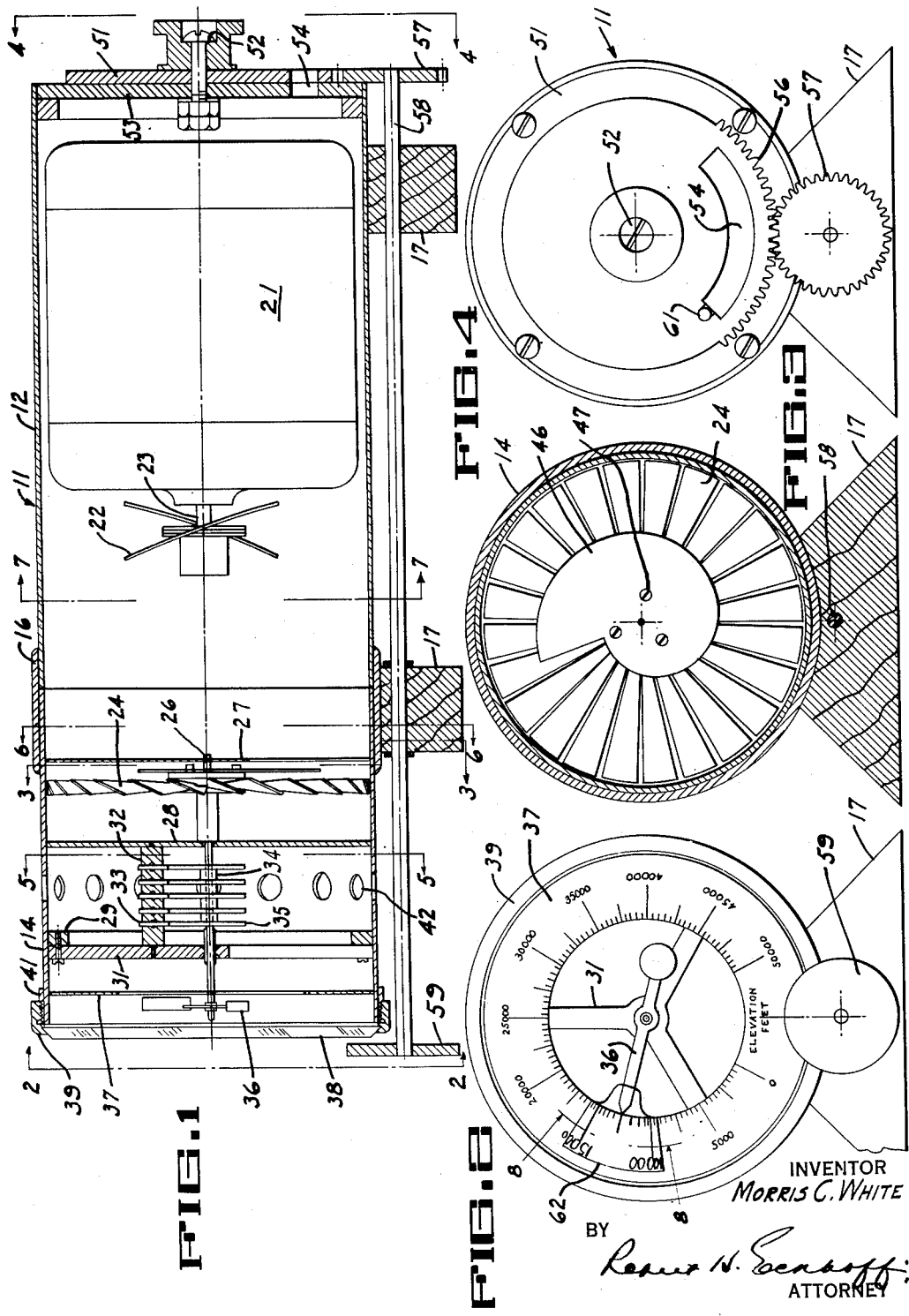
INVENTOR
MORRIS C. WHITE
BY
ATTORNEY March 29, 1949.　　　M. C. WHITE　　　2,465,775
ALTIMETER
Filed Aug. 10, 1945　　　　　　　　　　2 Sheets-Sheet 2
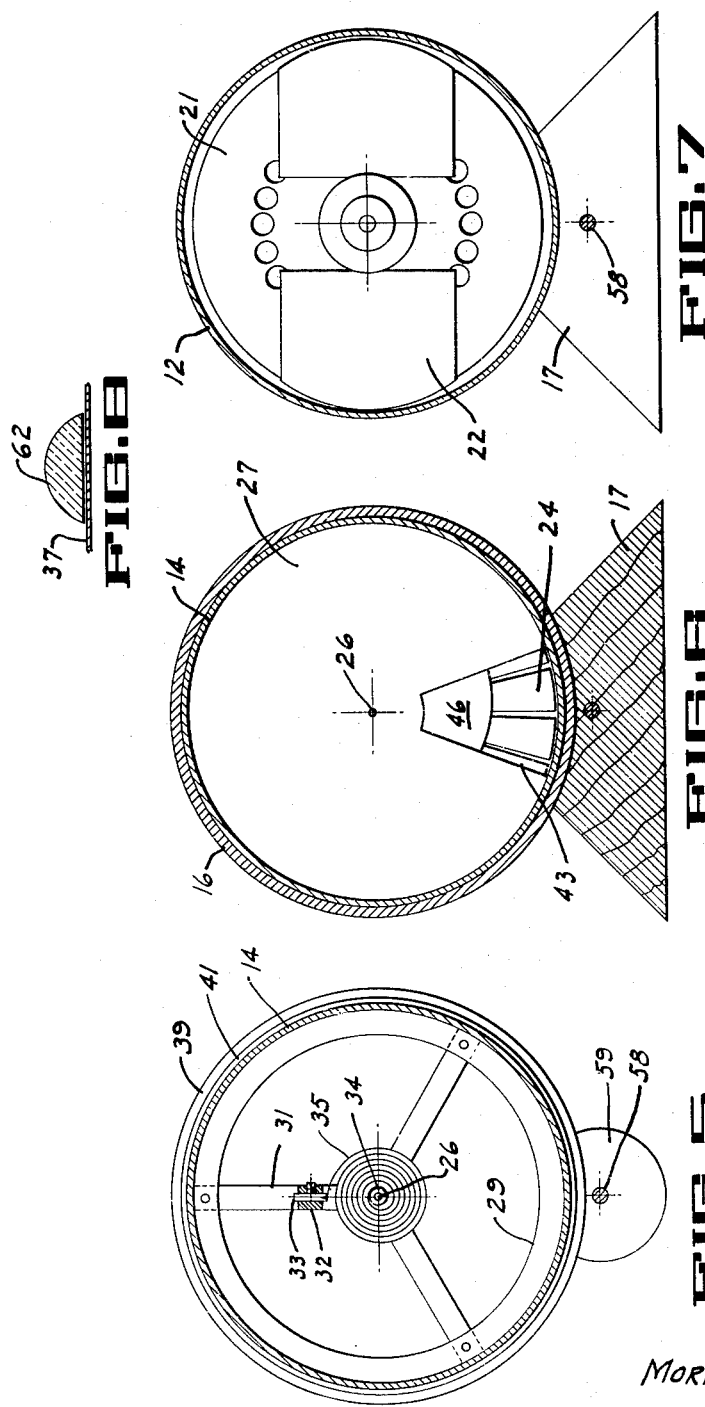
INVENTOR
MORRIS C. WHITE
BY Robert N. Eerhoff
ATTORNEY Patented Mar. 29, 1949

2,465,775

UNITED STATES PATENT OFFICE 2,465,775

ALTIMETER

Morris C. White, Mill Valley, Calif.

Application August 10, 1945, Serial No. 609,995

3 Claims. (Cl. 73—384)

This invention relates to improvements in the ascertaining of altitude and particularly to a novel method for determining altitude as well as a novel device useful in airborne devices such as balloons and aeroplanes which may, upon occasion, attain a position in the atmosphere considerably elevated above the earth's surface.

The common type of altitude measuring device is provided by an aneroid pressure response device which functions through the expansion and contraction of an element in which a fixed pressure has been established. Usually, the movement is taken off of a movable metal diaphragm. There are various objections to this type of device. For example, the constant working tends to harden the diaphragm and make it less sensitive to pressure changes. As a consequence, it is necessary to check the instrument and recalibrate it at very frequent intervals. Because the diaphragm travel is, at its very best, relatively small, it is necessary to introduce a diaphragm travel magnifying linkage which includes a train of gears or levers connecting the diaphragm to an indicator arm. It will be obvious that such a train includes friction, backlash and lost motion, each of which lessens the accuracy of the instrument and, when added together, introduce a relatively larger error. Further, since such linkage is subject to alteration due to shock and vibration, an error of unknown magnitude may be inadvertently introduced at any time.

The method and device of the present invention eliminate all of the foregoing difficulties, providing an altitude measuring instrument which is accurate, rugged and dependable, retaining its initial calibration for an indefinite period.

The present invention contemplates the establishment of a constant volume air stream set in motion by an air screw driven by a small constant speed motor. This stream is then caused to impinge upon a second air screw or movable rotor, the degree of rotation of this rotor being indicative of the power imparted to the second screw or rotor impingement. It should be obvious that, everything remaining otherwise the same except the altitude of the instrument above the earth's surface then the change in position of the second air screw is indicative of an altitude change. In practice, of course, the instrument will be subject to changes in atmospheric temperature, to changes in barometric pressure, to weather changes and to those changes in air density due to differences in moisture content. These can be cared for by suitable compensating alterations made readily in the volume of air which impinges upon the rotor as by inclusion of easily incorporated thermostatically operated means providing a compensation for temperature change. The instrument can be "zeroed" at sea level and adjustment so made. Also, for the barometric pressure. As in the case of the aneroid diaphragm instrument, an observer can make suitable mathematical corrections for the exterior factors which may affect the instrument.

Normally the rotor movement is resisted by suitable means such as a hair spring. When the instrument is not in use, the hair spring is effective to maintain the rotor in a selected position. Upon application of the moving air stream to the rotor, if the instrument is at sea level, the instrument hand will indicate a zero elevation. As the instrument is taken to a higher altitude, the decrease in air density correspondingly reduces the power applied to the rotor and the rotor is turned to an extent indicative of the altitude change. The rotor is usually made integral with an indicating arm, a spring being applied directly to the rotor shaft. In this way, backlash, lost motion and multiplied error are absent. The utilization of a hair spring to rotate the rotor I have found to be quite satisfactory for the wind-up tension of such a spring is a linear function. Further, such a spring possesses the greatest degree of permanence of any type of spring known, due to the relatively long length of spring involved and the very small bending moment under which the spring works in any normal operation.

As one moves away from sea level, the pressure difference for each foot increase in altitude decreases so that if means is not provided for compensating for this change, a logarithmic scale must be provided. In the aneroid diaphragm instrument, linearity compensation is achieved usually through an arrangement of links and a chain passing over a roller. This increases the friction and detracts additionally from the accuracy of the instrument. In accordance with the present invention, a suitably shaped shield or mask is placed between the rotor and the constant volume air stream source. This mask is so positioned that at the sea level or zero position, only a predetermined portion of the rotor blades are exposed to the path of the air stream. As the altitude is increased and the rotor is turned, a gradual increase in the rotor blade area is exposed to the path of the air stream. The increase in exposed rotor area is coordinated with the altitude so that a direct reading, linear scale can be utilized on the instrument dial.

It is the generally broad object of the present invention to provide a novel means for accurate determination of elevation above sea level.

A further object of the present invention is to provide a novel instrument for the determination of altitude above sea level and particularly one suited to use between sea level and a relatively great elevation, one of the order of fifty thousands of feet.

The invention includes other objects and features of advantage, some of which, together with the foregoing will become more apparent upon consideration of the following disclosure of a preferred form of device, one embodying the novel method of the present invention. In the drawings accompanying and forming a part hereof, Figure 1 is a side elevation, partly in section through a device embodying the present invention.

Figures 2 through 7 are respectively views taken along the lines 2—2, 3—3, 4—4, 5—5, 6—6 and 7—7 of Figure 1 while Figure 8 is a section along the line 8—8 of Figure 2.

Referring to the drawing, a tubular casing generally indicated at 11 is provided. For convenience, it is generally made circular in cross section and in two portions, 12 and 14. A sleeve 16 is extended about portion 12 and serves as a support for portion 14, the two portions and the sleeve being secured by screws not shown. To support the casing, feet 17 are provided on the casing.

An electric motor, generally indicated by numeral 21, is mounted in casing portion 12, this motor being of the constant speed type. The motor may be driven by alternating current, by direct current or may be of the so-called universal type adapted for use upon either direct or alternating current. An air screw 22 is mounted upon motor shaft 23 to force a substantially constant volume of air through casing 11 from left to right in Figure 1.

Mounted cooperatively with respect to the stream delivered by the first air screw 22 is a rotor or second air screw 24 mounted upon a shaft 26 supported for rotation in a first transverse member 27 and in a second transverse member 28. To mount shaft 26 for rotation, one can utilize suitable bearings but for simplicity in the drawings I have merely shown the shaft as mounted directly for rotation in the transverse wall members 27 and 28. Each of the wall members 27 and 28 are suitably secured to casing portion 14.

In a forward portion of casing 14 is mounted a ring 29 and to this is secured a three-legged spider 31 through which shaft 26 extends. A support member 32 is provided between one of the arms of the spider and the transverse wall member 28, this support member serving as a fixed support for screws 33 to which is secured one end of each of several hair springs generally indicated by numeral 35 and of which I have shown five in the drawing. The other end of each of these springs is secured to a bushing 34 secured to shaft 26.

At its forward end, shaft 26 carries an indicator arm 36 which moves over a dial 37, the arm and dial being protected by glass 38 retained in position by a ring 39 screwed to ring 41 on casing portion 14.

The instrument so far described operates as follows: with the motor shaft 23 turning over at a constant speed, air screw 22 delivers a fixed volume of air to rotor 24 with the result that the tension placed on shaft 26 by the hair springs 33 is overcome to an extent depending upon elevation of the instrument above sea level, the air passing the rotor 24 being released through the several apertures 42 in casing portion 14. With the motor at rest, the normal position of the indicator arm is at the point of extreme elevation; on the dial shown, this is the 50,000 foot position. If the motor is started up, the arm gradually swings back to the zero elevation position, assuming the instrument to be at sea level. As the instrument is raised above sea level, the density of the air, of course, decreases and the indicator arm 36 sweeps over the dial to give a suitable indication of this.

In the form shown, the second air screw follows the first air screw, the hair springs opposing this. The second screw can, of course, be made so as to move in a direction opposite to that of the first screw, the hair springs then resisting its movement.

Upon reference to Figure 2 it will be noted that the elevation is shown as a linear scale. This is made possible by inclusion of wall 27 between the screws and by provision of an air admission aperture 43 therein. Air forced by the first air screw against wall 27 is only permitted to contact that portion of rotor 24 which is opposite the opening 43. In accordance with this invention, I mount upon rotor 24 a structure which, as the rotor turns, compensates for and offsets the variation in density due to an increase in elevation so that the indicator arm 36 can be employed with a linear type scale as shown instead of the usual logarithmic type scale. Thus, referring to Figure 3, a rotor mask 46 is secured to the rotor by several screws 47. The shape of this, in conjunction with aperture 43 is such that in the second air screw position corresponding to the sea level position (Figure 6) a minimum of rotor is exposed while when the rotor is in a position corresponding to that of a considerable elevation above sea level more rotor is exposed (Figure 3). The form of mask shown is that of a snail cam; with the wedge shape form of air admission aperture, this gives a direct linear movement of the shaft 26. The shape of the aperture and the mask can be varied to secure the same result.

To correct for variation in barometric pressure at sea level and to permit the device to be "zeroed," movable plate 51 is mounted upon a bolt 52 positioned on end wall 53 apertured at 54 to admit air. Plate 51 includes a gear teeth segment 56 formed about the periphery thereof and engaged by a pinion gear 57 mounted upon a shaft 58 which is in turn supported for rotation by the several feet 17. A knob 59, mounted on an end of shaft 58 at the front of the instrument enables an operator to rotate shaft 58 and so move gear 57 (Fig. 4) on the end of the shaft. This rotation of gear 57 is effective to change the position of plate 51 so that, at sea level, indicator arm 36 is positioned at a zero reading at the existing barometric pressure.

The instrument shown includes a dial calibrated between 0 and 50,000 feet. To enable an accurate reading to be secured, arm 36 carries a magnifying element 62 which magnifies the portion of the dial, as appears in Figure 2, immediately beneath the magnifying element.

From the foregoing I believe it will be obvious that I have provided a novel and simple instrument capable of direct employment to measure altitude and free of all the present difficulties inherent in an instrument of the aneroid type.

I claim:

1. An altimeter comprising a casing, an air screw rotatable in said casing, a constant speed motor for rotating said screw in said casing, a wall in said casing against one side of which said screw discharges air, said wall having an aperture therein, said casing having an air inlet and discharge apertures, a rotor, a shaft supporting said rotor for rotation under the influence of air forced through the casing by said air screw, spring means for applying a resisting force to said shaft opposing rotation of said shaft by said air acting on said rotor, a shield carried on said shaft between said aperture and said rotor and movable with said shaft to vary the effective opening provided by said aperture to control the amount of air admitted to rotate said rotor, an indicator arm on said shaft, and a dial cooperatively positioned with respect to said indicator arm.

2. An altimeter comprising a constant speed motor having a shaft, an air screw on said motor shaft, a rotor shaft, a rotor on said shaft and cooperatively positioned to receive air from said screw, valve means responsive to the rotation of said rotor shaft for admitting a volume of air to said rotor from said screw varying with the elevation of said altimeter above sea level, a calibrated dial, an indicator arm on said rotor shaft movable over said dial, and a hair spring opposing rotation of said rotor shaft.

3. An altimeter comprising a casing having an air discharge aperture, an air screw rotatable in said casing, a constant speed motor for rotating said screw in said casing, means controlling air admission to said casing, a wall in said casing against one side of which said screw discharges air, said wall having a wedge shaped aperture therein, a rotor, a shaft supporting said rotor for rotation, a snail cam shield mounted on said shaft and interposed between said rotor and said wall and movable past said aperture to vary the amount of air admitted to said rotor, a hair spring fixed at one end and secured to said shaft to apply a resisting force to said shaft opposing rotation of said shaft by said air acting on said rotor, an indicator arm on said shaft, and a dial cooperatively positioned with respect to said indicator arm.

MORRIS C. WHITE.

REFERENCES CITED

The following references are of record in the file of this patent:

UNITED STATES PATENTS

| Number | Name | Date |
| --- | --- | --- |
| 679,577 | Schaffner | July 30, 1901 |
| 1,664,752 | Konig | Apr. 3, 1928 |
| 2,092,640 | Dallmann | Sept. 7, 1937 |

FOREIGN PATENTS

| Number | Country | Date |
| --- | --- | --- |
| 16,215 | Great Britain | Jan. 7, 1911 |
| 159,845 | Great Britain | July 5, 1922 |
| 395,064 | Germany | May 3, 1924 |